358-140. OR 2,938,947 SR
SEARCH ROOM

May 31, 1960 KARL-AUGUST DREYER 2,938,947

METHOD AND APPARATUS FOR TRANSFORMING SYSTEMS OF COORDINATES

Filed Feb. 8, 1957 4 Sheets-Sheet 1

T 5055
RK

Inventor
Karl A. Dreyer
By Ralph B. Stewart
attorney

Inventor
Karl A. Dreyer
By Ralph B. Stewart
attorney

Inventor
Karl A. Dreyer
By Ralph B. Stewart
Attorney

May 31, 1960 KARL-AUGUST DREYER 2,938,947

METHOD AND APPARATUS FOR TRANSFORMING SYSTEMS OF COORDINATES

Filed Feb. 8, 1957 4 Sheets-Sheet 4

Inventor
Karl A. Dreyer
By Ralph B. Stewart
Attorney 2,938,947
Patented May 31, 1960

2,938,947

METHOD AND APPARATUS FOR TRANSFORMING SYSTEMS OF COORDINATES

Karl-August Dreyer, Darmstadt-Eberstadt, Germany, assignor to Max Grundig, Furth, Germany Filed Feb. 8, 1957, Ser. No. 639,009

Claims priority, application Germany Mar. 8, 1956

7 Claims. (Cl. 178—6)

The present invention is concerned with the transforming of a picture represented in a first coordinate system into another picture represented in a second coordinate system which is different from the first coordinate system. The method is characterized in that first the picture to be transformed is scanned by a television pickup apparatus in such a manner that the scanning pattern or raster corresponds to a first coordinate system, and the signal thus obtained is reproduced by means of a television reproducing apparatus having a picture composition pattern or raster corresponding to a second coordinate system.

The operation of the system according to the invention will be explained with reference to several examples for carrying out this method. For example, it is intended to reproduce a curve represented in a rectangular coordinate system in a polar coordinate system. In this case, the curve will be superimposed on the light-sensitive layer of the picture pick-up apparatus and then scanned line by line corresponding to the rectangular coordinate system. The signal obtained in this operation is then applied to the picture reproducing apparatus and is used to build up a new picture by means of a spirally guided reproducing beam. As a result of the spiral path of the beam on the reproducing screen, the picture obtained is represented in polar coordinates, if care is taken that the duration of one revolution of the beam equals the scanning time of a single line in the picture pick-up apparatus and if the change of frames in the reproducing apparatus is synchronized with that in the pick-up apparatus, i.e., depending upon whether the picture is built up from the outside to the inside or from the inside to the outside, the beam of the picture tube has to jump from the center of the picture to the outer end of the spiral, or from its outer end to the center of the picture, at the instant of the frame change in the pick-up apparatus.

Figures 1A, 1B:
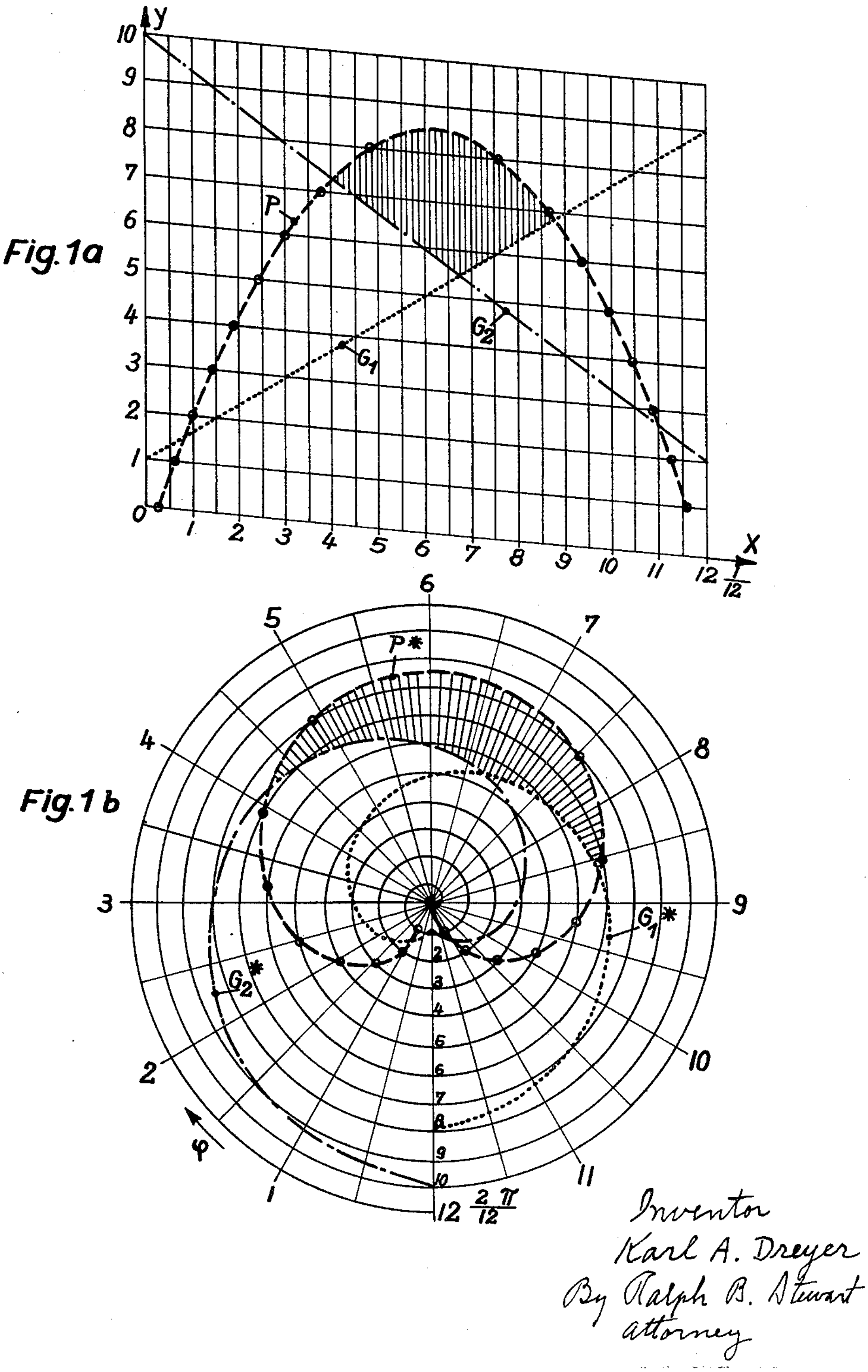

Figures 1*a* and 1*b* illustrate schematically how the transformation of the coordinates is accomplished. The approximately rectangular coordinate system *xy* in Figure 1*a* contains a system of equidistant lines parallel to the *x* axis, as shown at $y_0, y_1, \ldots y_{10}$, and a system of equidistant lines which are approximately perpendicular to the aforementioned lines and which are parallel to the *y* axis, as shown at $x_0, x_1, x_2, \ldots x_{12}$.

For the purpose of providing a representation which is as simple as possible, the present example is not based on an exactly rectangular coordinate system, because in the conventional line-scanning method used in television technique, the deflection in the "picture deflection direction" takes place continuously during the scanning of a picture and, therefore, the line direction is not exactly perpendicular to the "picture deflection direction."

The equation for the angular deviation $\Delta\varphi$ is as follows:

$$\Delta\varphi = \text{arc tangent}\,\frac{\text{height of picture}}{\text{number of lines}\cdot\text{picture width}}$$

The angular deviation can be neglected in case of a sufficient number of scanning lines. If the composition of the picture in the picture reproducing apparatus in "picture direction" takes place continuously in radial direction corresponding to the continuous deflection of the scanning beam in the picture pick-up apparatus, i.e. if the picture is built up according to a spiral of Archimedes, no error will occur in the transformation of a picture represented in rectangular coordinates when it is transformed into a polar coordinate system. Therefore, it is not necessary in order to obtain an accurate coordinate transformation that, during the scanning of the picture, the direction of the lines be exactly parallel to an axis of the first coordinate system. This fact will be apparent from the manner in which the parabola P indicated in Figure 1*a* is transformed into the polar coordinate system shown in Figure 1*b*. While the intersections of the lines $y_1$ to $y_9$ are unsymmetrical to the centerline and, consequently, the respective points on the individual spiral turns of Figure 1*b* are located at unsymmetrical angular distances from the radius $$6\cdot\frac{2\cdot\pi}{12}$$

which corresponds to the centerline, the picture P* of the parabola in Figure 1*b* becomes symmetrical with respect to this radius.

Figure 2:
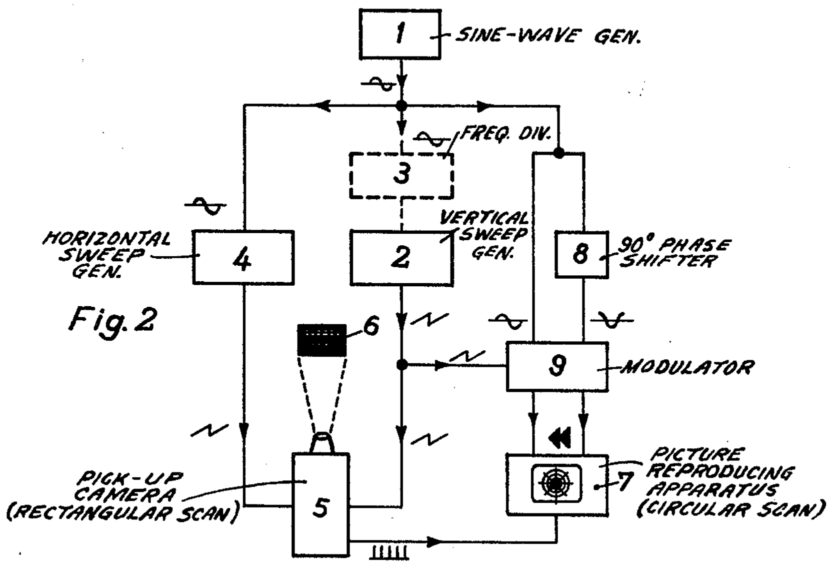

Figure 2 shows a block diagram for an embodiment of an apparatus for coordinate transformation as described.

1 denotes an oscillation generator producing a sine wave with a horizontal frequency $f_z$, and 2 is a second generator oscillating, for example, with a saw-tooth shaped wave of the vertical scanning frequency $f_b$. The latter generator is controlled by generator 1 through a frequency divider 3 which reduces the frequency $f_z$ in a suitable manner to the picture frequency $f_b$ which is in a certain relation to the line frequency $f_z$. Furthermore, the saw-tooth generator 4 is synchronized by the generator 1 whereby the output voltage of the saw-tooth generator 4 serves to deflect the lines of the scanning beam in the pick-up apparatus 5. The beam deflection in the direction approximately perpendicular thereto is effected by means of the saw-tooth shaped deflection voltage or current at the frequency $f_b$ produced in the generator 2. An image of the picture 6 is formed on the light-sensitive layer of the pick-up apparatus 5 and is scanned according to a system of rectangular coordinates. The signal obtained in this manner is supplied to the picture reproducing apparatus 7 for brightness control of the reproducing beam. The deflection of the reproducing beam takes place synchronously with that in the pick-up apparatus, and synchronism is assured by deriving the deflection voltages from the same generators as in the pick-up apparatus.

In order to obtain the spiral picture build-up, the sine-shaped voltage of the frequency $f_z$ derived from the generator 1 is first converted into two voltages displaced 90° with respect to one another. The phase shifter 8 is provided for this purpose. In the modulator 9 the two quadrature voltages are modulated by the saw-tooth output voltage of the generator 2. If these modulated voltages from modulator 9 act on the reproducing beam of the picture reproducing apparatus 7 in directions perpendicular with respect to one another, the desired kind of picture build-up in the form of a spiral of Archimedes is obtained.

As can be easily understood, the reverse transformation can be carried out in an analogous manner as in the example described for the transformation of rectangular to polar coordinates. In such case, it is merely necessary to exchange the television pick-up apparatus 5 and the reproducing apparatus 7 in the block diagram of Figure 2.

Figure 3:
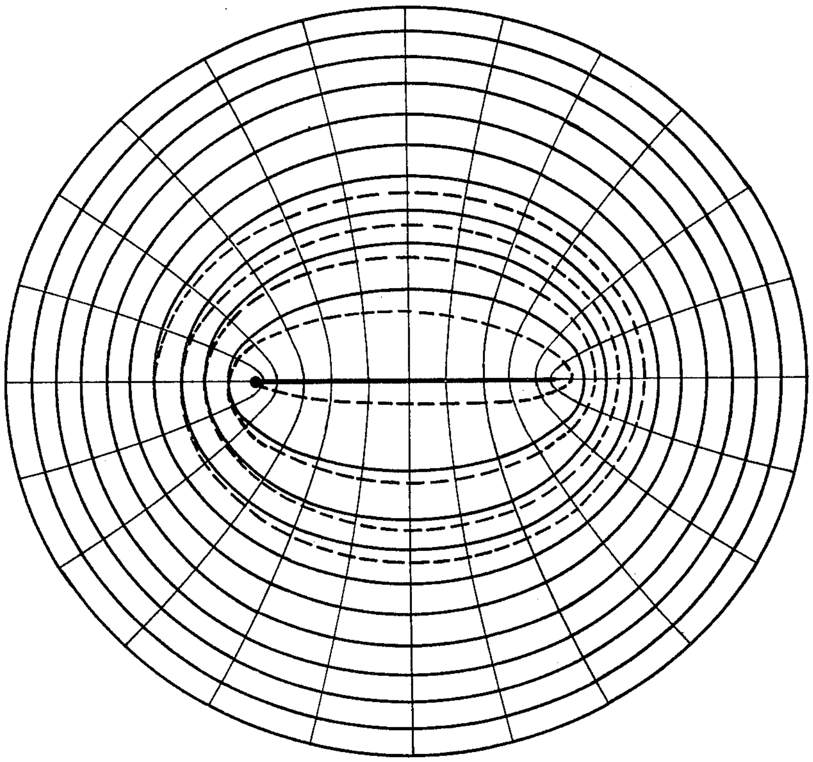

The invention is not limited to the described transformations. Of the large variety of possible transformations, there will be described as a further example the transformation of rectangular coordinates into so-called Jacobian coordinates. The latter coordinates consist of a system of ellipses having common focal points and their orthogonal trajectories, i.e., a system of hyperbolas. Such Jacobian coordinate system is shown in Figure 3. This system can be used in the reproducing apparatus and in the pick-up apparatus without great manufacturing expense for either reproducing or scanning.

In analytic geometry, the fundamental equation $$a^2=b^2+e^2$$

is well known, in which $a$ is the large half-axis of the ellipse $b$ is the small half-axis of the ellipse, and $e$ half of the distance between the focal points of the ellipse.

Since $e$ is constant, according to the definition, the relation $$a^2-b^2=\text{constant}$$

If now, in a manner analogous to that used when a spiral of Archimedes is substituted according to the first example for the equidistant concentric circles, a corresponding elliptical spiral is used in place of the ellipses with common focal points, then the deflection of the reproducing beam or scanning beam must take place under control of a sine wave having components in two directions perpendicular with respect to one another, whereby the one amplitude increases linearly in time from the value $e$, which is a constant to a maximum value, or vice versa decreases from a maximum to the value $e$, while the deflection also follows the form of a sine wave in the direction perpendicular thereto, but with a phase displacement of ±90°, whereby the amplitude increases from zero value according to the equation $$a^2-b^2=e^2=\text{constant}$$

i.e., according to the increase of a hyperbola to its maximum value or its decrease therefrom to zero.

The turns of the above-mentioned elliptical spiral are illustrated in dashed lines on the Jacobian coordinate system shown in full lines in Figure 3.

Figure 4:
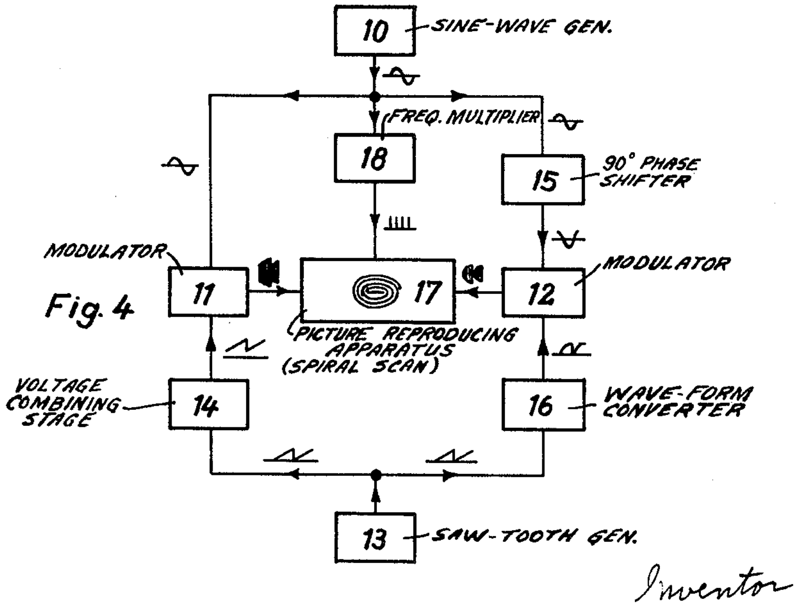

The block diagram of Figure 4 shows how the above requirements can be fulfilled. The starting point is the generator 10. The frequency of the sine wave voltage generated thereby controls the duration of one rotation of the reproducing or scanning beam. The two deflection voltages or currents are modulated in the modulators 11 and 12 in a suitable manner. The voltage or the current determining the major axis has to be modulated trapezoidally so that the beam describes the desired elliptical spiral. This modulation takes place in the modulator 11. The modulation voltage is derived from the saw-tooth generator 13 oscillating at the vertical scanning frequency. The saw-tooth voltage derived therefrom is fed to the device 14, in which an adjustable direct current voltage is added thereto. The value of this D.C. voltage controls the distance between the focal points of the ellipses of the Jacobian coordinate system, while the sum of the D.C. voltage and the maximum value of the saw-tooth voltage controls the magnitude of the larger half-axes of the ellipses. The required quadrature phase displacement of 90° between the deflection voltages for the two deflecting directions is provided by the phase shifter 15 in the channel to modulator 12. The voltage derived from the phase shifter 15 is modulated hyperbolically in the modulator 12 in timed relation to the saw-tooth voltage derived from the generator 13. The modulation voltage required for this purpose is generated in any desired manner in the converting apparatus 16. Care has to be taken that the modulation voltage or the beam deflection in the picture reproducing apparatus 17 caused by the modulation product shall have such shape and value that the above-mentioned relation between the deflections in the two directions $$a^2-b^2=e^2=\text{constant}$$

is fulfilled, wherein $a$ corresponds to the maximum deflection amplitude in the one direction (maximum value of the trapezoidally modulated voltage)

$e$ corresponds to the distance between the focal points of the ellipses (minimum value of the trapezoidally modulated voltage)

$b$ corresponds to the maximum deflection amplitude in the second direction (maximum value of the hyperbolically modulated voltage).

Light or dark spots may be produced on the elliptic spirals traced by the picture reproducing apparatus 17 in order to make the system of hyperbolas visible. A frequency multiplier 18 controlled by generator 10 can be used as marking pulse generator whereby the frequency produced by the generator 10 is multiplied according to the number of hyperbolas to be obtained, and the high frequency marker pulses control the light or darkness of the reproducing beam of the picture reproducing apparatus.

The beam deflection method according to Jacobian coordinates, described with reference to Figure 4, can be combined with other deflection methods in a general manner indicated by the block diagram of Figure 2 for the purpose of coordinate transformation.

The invention is not limited to the transformation of known coordinate systems to certain other systems. The invention may also advantageously be used to solve other problems. For example, in case of functional relations empirically found and plotted in the form of curves, these relations can be analytically determined or verified. Such problems occur frequently in engineering. If such a functional relation between two values is being determined by measuring, the results of the test are usually plotted in the form of curves. To find the equation fulfilling this curve, a function corresponding to the path of this curve is assumed, whereby the constants of the assumed function are determined by means of the individual measuring points which are then plotted and compared with the path of the experimentally found curve. In some cases, it is possible to obtain a straight line from the original curvilinear graph presenting the path of the function by selecting another type of subdivision for the coordinate axis, for example a logarithmic or reciprocal subdivision, whereby the kind of function is determined.

This relatively cumbersome operation, which in many cases has to be repeated several times, if the experimentally found graph does not correspond to the presupposed function, can be carried out in many cases, principally in the same manner, but substantially more quickly and more simply according to the method of the invention.

Figure 5:
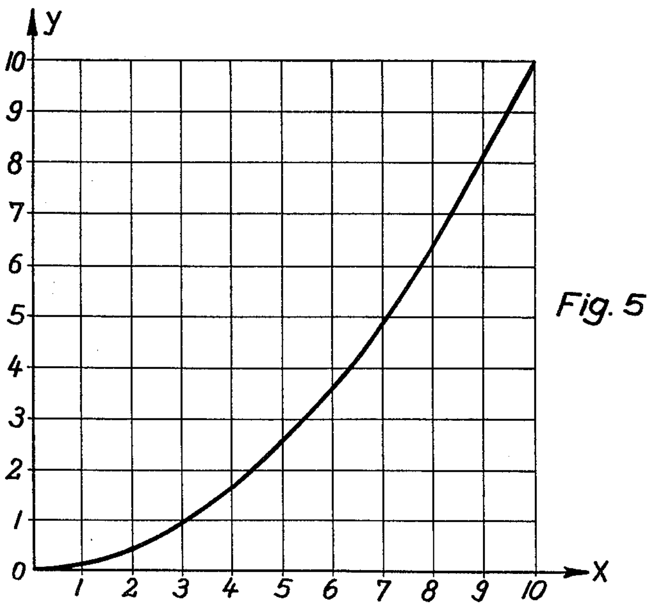

This will be explained with reference to Figure 5. It is assumed that the graph plotted in the upper coordinate system $x$, $y$ in Figure 5 is plotted from data obtained by tests.

Figure 6:
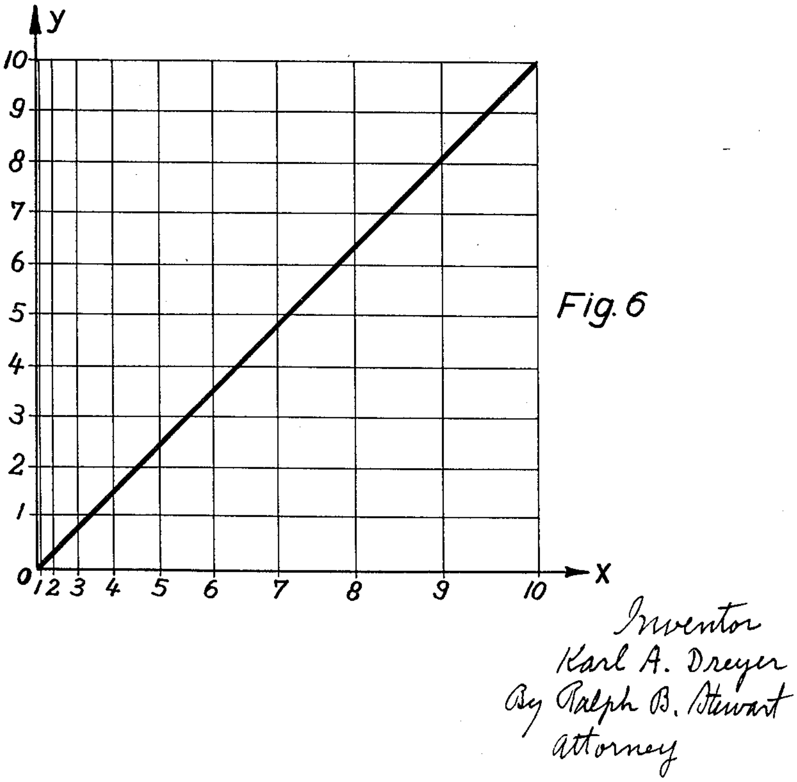

The present picture is scanned by a television pick-up apparatus line by line in order to determine the kind of function $y=f(x)$, whereby the deflection of the scanning beam may take place in the $y$ as well as in the $x$ direction linearly with variation in time. The picture in the reproducing apparatus is obtained with a voltage increasing, at least, in one deflecting direction non-linearly with time. Since the shape of the graph in Figure 5 suggests a function of the formula $$y=\text{constant}\cdot x^2$$

the deflection in the $x$ direction will be provided by a voltage increasing with the square of the time. Such a voltage can be obtained without difficulty in a manner known per se by periodically charging a condenser with constant current during the scanning of a line and by rapid discharge. If the function illustrated in Figure 5 is actually the assumed function, a straight line will result. Thus, the curve $y=f(x)$ of Figure 5 will be converted into the straight line $y=f(x)$ of Figure 6, whereby the assumption is proven to be true.

Thus, the invention makes possible the design of an apparatus to analyze measuring results represented for example in form of graphs, in the manner described in the foregoing, so as to find out whether the results obtained from tests correspond to the values of a function to which the apparatus is set.

This means that the apparatus has to be made adjustable to select the shape of the deflection voltage or of the deflection current, for example, saw-tooth shaped, parabolic or varying in accordance with a logarithmic or *e*-function. By selecting different shapes for the deflection voltage in the one or the other deflection direction, it is possible within a very short time to ascertain whether the test results to be analyzed correspond to the values of one of the functions provided by the deflection set-up.

In the appended claims the term "picture" is used in a broad sense to refer to any two-dimensional graphical representation, such as a photograph, sketch, printed sheet, graphic curves, and like representations.

I claim:

1. Apparatus for converting a picture illustrated in a first coordinate system into a picture illustrated in a second coordinate system different from the first coordinate system comprising, light-sensitive pick-up apparatus for successively scanning the elementary areas of the picture field with a scanning movement according to said first coordinate system and producing a signal varying with the light values of the successive elementary areas of said picture, picture-reproducing apparatus having a viewing screen and a light-producing beam, scanning means operating in synchronism with said pick-up apparatus for moving said beam over said screen according to said second coordinate system, and means controlling the intensity of said beam by the signal from said pick-up apparatus.

2. Apparatus according to claim 1 wherein said pick-up apparatus includes means for effecting linear scanning of the picture field according to the rectangular coordinate system, and said reproducing apparatus includes means for effecting scanning of the viewing screen in a spiral path.

3. Apparatus according to claim 1 wherein said pickup apparatus includes means for effecting linear scanning of the picture field according to the rectangular coordinate system, and said reproducing apparatus includes means for effecting scanning of the viewing screen in a circular spiral.

4. Apparatus according to claim 1 wherein said pick-up apparatus includes means for effecting linear scanning of the picture field according to the rectangular coordinate system, and said reproducing apparatus includes means for effecting scanning of the viewing screen in an elliptical spiral.

5. Picture-translating apparatus comprising light-sensitive pick-up apparatus for effecting linear scanning of a picture field according to the rectangular coordinate system and producing a signal varying with the light values of the successive elementary areas of said picture, and picture-reproducing apparatus including scanning means for effecting scanning of a light-producing beam over a viewing screen at a uniform rate in one direction and at a non-uniform rate at a direction at right angles thereto, and means controlling the intensity of said beam by the signal from said pick-up apparatus.

6. A system for converting a picture from one form into a different form comprising light-sensitive picture pick-up apparatus for scanning the picture field with a scanning movement in two coordinate directions and producing a signal varying with the light values of the successive elementary areas of said picture, picture-reproducing apparatus having scanning means operating in synchronism with the pick-up scanning and moving a light-producing beam over a viewing screen in two coordinate directions at least one of which varies according to a different law from that of the corresponding coordinate scanning movement of said pick-up apparatus, and means controlling the intensity of said beam by the signal from said pick-up apparatus.

7. A picture converting system according to claim 6 wherein one picture apparatus has linear scanning movement in one co-ordinate direction, and the corresponding co-ordinate scanning movement of the other picture apparatus is logarithmic.

References Cited in the file of this patent

UNITED STATES PATENTS

| | | |
|---|---|---|
| 2,557,691 | Rieber | June 19, 1951 |
| 2,703,150 | Rieber | Mar. 1, 1955 |

OTHER REFERENCES

Tele-Tech & Electronic Industries, April 1955, pages 94, 95, 96, 112 and 133.

Notice of Adverse Decision in Interference

In Interference No. 93,916 involving Patent No. 2,938,947, K.-A. Dreyer, METHOD AND APPARATUS FOR TRANSFORMING SYSTEMS OF COORDINATES, final judgment adverse to the patentee was rendered May 18, 1965, as to claims 1 and 6.

[*Official Gazette July 20, 1965.*]